United States Patent
Chang et al.

(10) Patent No.: US 10,641,331 B1
(45) Date of Patent: May 5, 2020

(54) BALL CAGE FOR BALL BEARING (71) Applicant: HIWIN TECHNOLOGIES CORP., Taichung (TW)

(72) Inventors: Che-Kang Chang, Taichung (TW); Yu-Lin Lai, Taichung (TW); Cheng-Lung Wang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 16/286,010

(22) Filed: Feb. 26, 2019

(51) Int. Cl.
*F16C 33/38* (2006.01)
*F16C 19/06* (2006.01)

(52) U.S. Cl.
CPC .......... *F16C 33/3887* (2013.01); *F16C 19/06* (2013.01)

(58) Field of Classification Search
CPC .............. F16C 33/3837; F16C 33/3843; F16C 33/385; F16C 33/3856; F16C 33/3887
See application file for complete search history.

(56) References Cited

U.S. PATENT DOCUMENTS

| | | | | |
|---|---|---|---|---|
| 3,096,129 A | * | 7/1963 | Hay | F16C 19/163 384/470 |
| 7,828,483 B2 | * | 11/2010 | Fukuda | F16C 33/3856 384/448 |
| 8,939,044 B2 | * | 1/2015 | Ueno | F16C 19/06 74/458 |
| 2009/0080825 A1 | * | 3/2009 | Koda | F16C 19/163 384/572 |

FOREIGN PATENT DOCUMENTS

| | | |
|---|---|---|
| DE | 112012001115 T5 | 12/2013 |
| JP | S64-716 U | 1/1989 |
| JP | H1-55808 B2 | 11/1989 |
| JP | 2008-39069 A | 2/2008 |
| JP | 2008-57639 A | 3/2008 |
| JP | 2013-148116 A | 8/2013 |
| JP | 2016-118294 A | 6/2016 |
| JP | 2016-151345 A | 8/2016 |
| JP | 2016-153685 A | 8/2016 |
| JP | 2016-223505 A | 12/2016 |

* cited by examiner

*Primary Examiner* — James Pilkington
(74) *Attorney, Agent, or Firm* — Muncy, Geissler, Olds & Lowe, P.C.

(57) ABSTRACT

A ball cage for ball bearing includes a first race, a second race, a plurality of first ribs equiangularly arranged on the first race with a first curved groove defined between each two adjacent first ribs, and a plurality of second ribs equiangularly arranged on the second race with a second curved groove defined between each two adjacent second ribs. The first ribs are respectively and partially stacked on the second ribs so that each first curved groove is combined with one respective second curved groove to create a respective ball accommodation chamber. Thus, the ball cage can be commonly used for ball bearings lubricated with grease or oil gas to increase the convenience of use.

5 Claims, 7 Drawing Sheets

BALL CAGE FOR BALL BEARING

BACKGROUND OF THE INVENTION

1. Field of the Invention

The present invention relates to ball bearing technology and more particularly, to a ball cage for ball bearing.

2. Description of the Related Art

According to the different lubrication methods, the ball bearings are divided into two types: lubrication using grease and lubrication using oil gas. In order to match the two different lubricants mentioned above, the ball bearings will be equipped with different ball cages to give the balls the desired lubrication.

In the case of a ball cage for lubrication using grease, a wall-like structure is disposed around each ball to store the grease, thereby allowing the grease to adhere to the surface of the ball and preventing the grease from being expelled out of the bearing during high speed rotation. A ball case for location using oil gas does not have the aforesaid grease storage structure.

As for the ball cage used in conjunction with oil gas, there is no such structure for storing grease, because the structures for storing grease will form an obstacle to the entry of oil gas during high speed operation which is called a gas barrier that blocks the oil gas from lubricating the balls. It can be seen that if the ball bearing is equipped with a ball cage for grease, only grease can be used as a lubricating medium during lubrication. If oil gas is used as a lubricating medium, the problem of insufficient lubrication will occur. In other words, the two different types of ball cages used in combination with different lubricating media are basically not interchangeable, but in practice, it is difficult to distinguish from the appearance of the ball bearing which ball cage is mounted inside, so it is easy to use a ball bearing that is equipped with an unsuitable type of ball cage, leading to a reduction in service life.

SUMMARY OF THE INVENTION

The present invention has been accomplished under the circumstances in view. It is the main object of the present invention to provide a ball cage for ball bearing, which is commonly used for ball bearings lubricated with grease or oil gas to increase the convenience of use.

To achieve this and other objects of the present invention, a ball cage for ball bearing comprises a first race, a second race, a plurality of first ribs and a plurality of second ribs. The second race coaxially mates with the first race. The outer diameter of the second race is smaller than the outer diameter of the first race. The first ribs protrude from the first race toward one side of the second race and equally spaced along the first race so that a first curved groove is defined between each two adjacent first ribs. Each first rib has a first free end, and a first guiding groove located on an end edge of the first free end. The second ribs protrude from the second race toward one side of the first race and equally spaced along the second race so that a second curved groove is defined between each two adjacent second ribs. Each second rib has a second free end, and a second guiding groove located on an end edge of the second free end. The second free ends of the second ribs are respectively stacked on the first free ends of the first ribs in a one-to-one manner so that each first curved groove mates with one respective second curved groove to create one respective ball accommodation chamber.

As can be seen from the above, the ball cage of the present invention can be commonly used for ball bearings that are lubricated with grease or oil gas. If the ball cage is used for a ball bearing that is lubricated with grease, the grease is applied to the surfaces of the balls evenly by the first ribs and the second ribs. If the ball cage is used for a ball bearing that is lubricated with oil gas, the combined structure of the first free ends of the first ribs and the second free ends of the second ribs is used to solve the gas barrier problem generated during high-speed rotation, enabling the oil gas to flow smoothly.

Preferably, the shortest distance between the outer circumference of the first race and the inner circumference of the second race is defined as D1; the distance between the end edge of the first free end of each first rib and the end edge of the second free end of the respective second rib is defined as D2; D1 and D2 satisfy the relation of $0.5D1<D2<D1$.

Preferably, each first rib further comprises a first bearing plane, and a first guiding ramp facing away from the first bearing plane; each second rib further comprises a second bearing plane, and a second guiding ramp facing away from the second bearing plane. The first bearing plane of each first rib is partially abutted against the second bearing plane of one respective second rib. The first guiding ramp of each first rib is disposed in parallel to the second guiding ramp of one respective second rib. Thus, the flow of oil gas is enhanced by the first and second guiding ramps.

Preferably, the cross section of each of said first guiding groove and said second guiding groove has an arc or non-arc shape.

Other advantages and features of the present invention will be fully understood by reference to the following specification in conjunction with the accompanying drawings, in which like reference signs denote like components of structure.

DETAILED DESCRIPTION OF THE INVENTION

Figure 1:
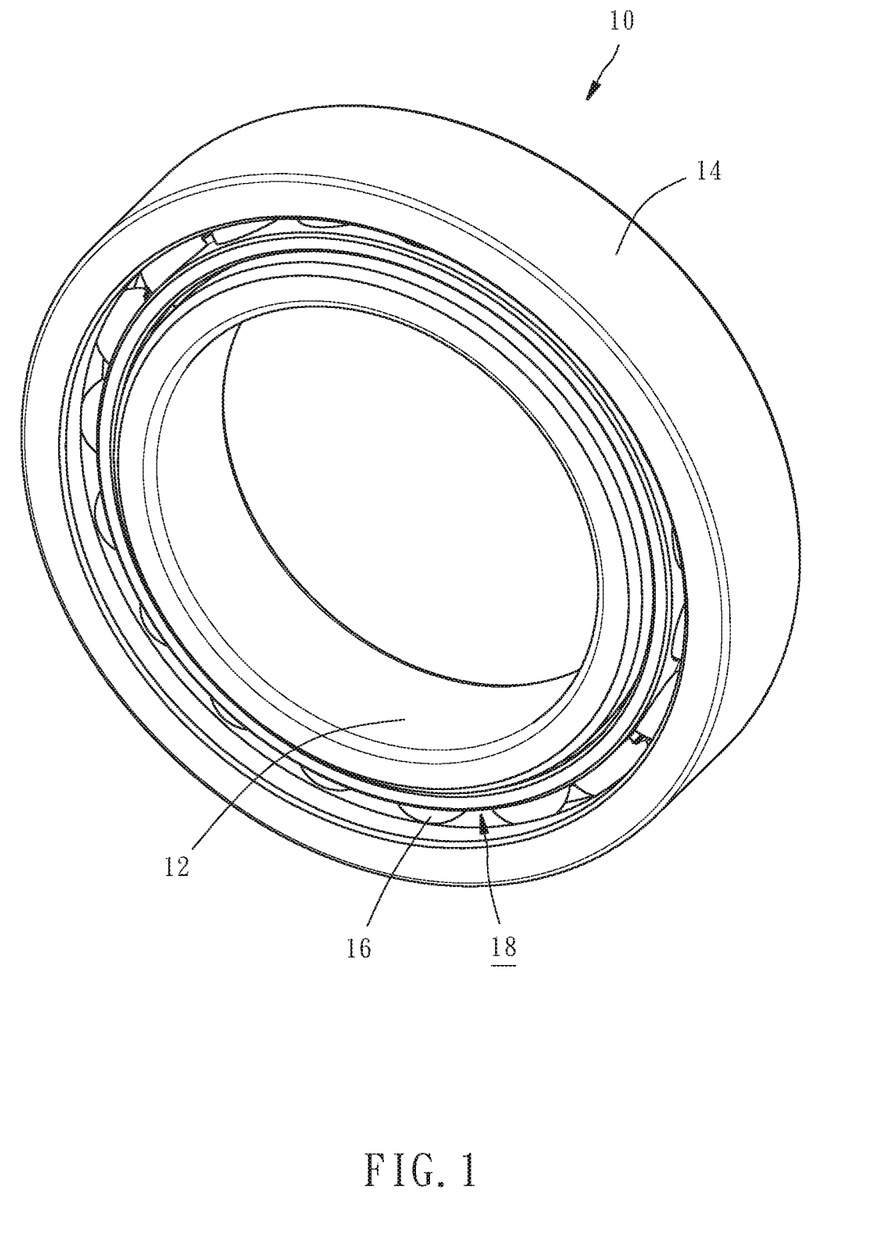
FIG. 1 is an oblique top elevational view of a ball bearing using a ball cage in accordance with the present invention.
Figure 2:
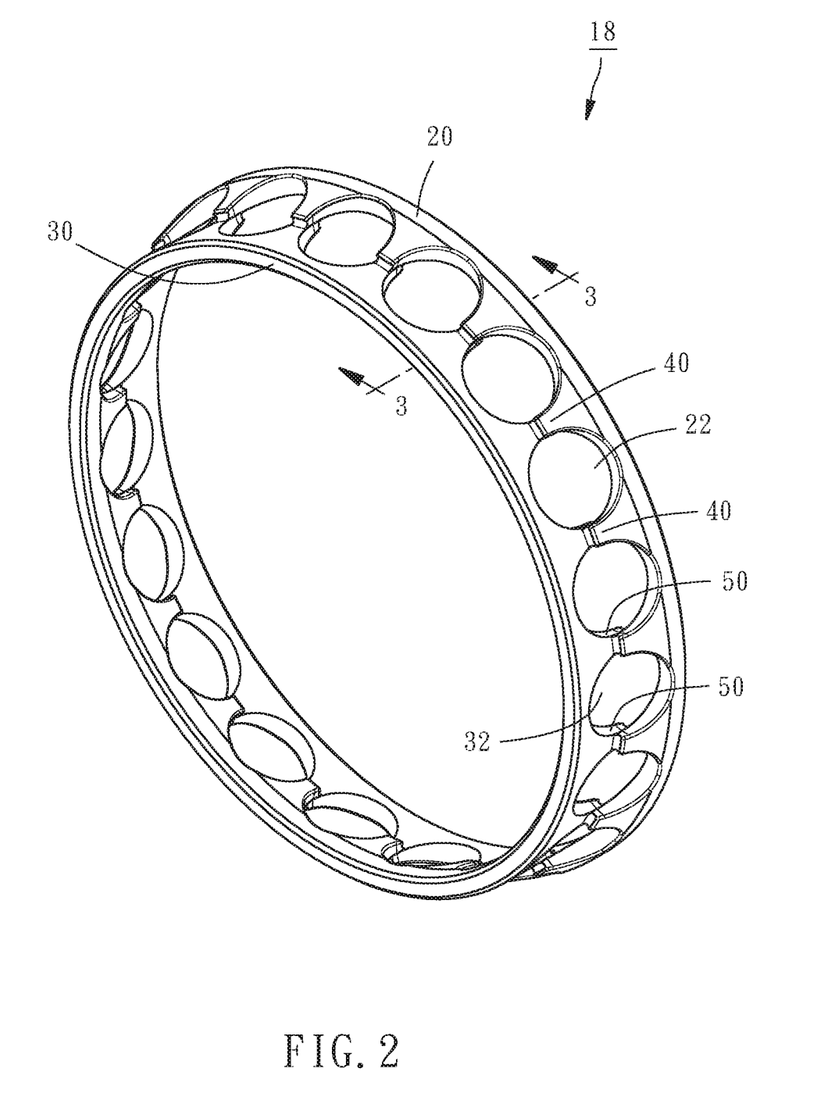
FIG. 2 is an oblique top elevational view of the ball cage in accordance with the present invention.

Referring to FIGS. 1 and 2, a ball bearing 10 comprises an inner race 12, an outer race 14, and a plurality of balls 16 disposed between the inner race 12 and the outer race 14. Referring to FIG. 2 again, a ball cage 18 in accordance with a first embodiment of the present invention is mounted between the inner race 12 and the outer race 14 and comprises a first race 20, a second race 30, a plurality of first ribs 40, and a plurality of second ribs 50. The ball cage 18 can be, but not limited to, made from metal, high molecular polymer or bakelite.

Figure 3:
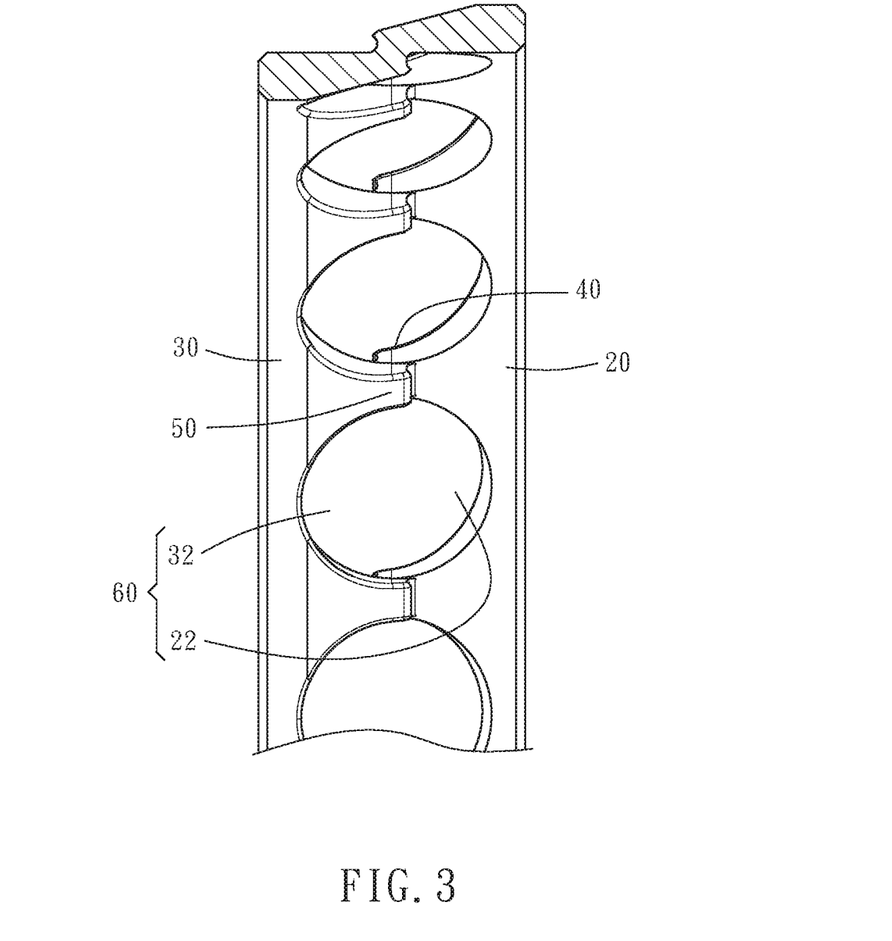
FIG. 3 is a sectional view taken along line 3-3 of FIG. 2.

As illustrated in FIGS. 2 and 3, the first race 20 and the second race 30 coaxially mate with each other. The outer diameter of the second race 30 is smaller than the outer diameter of the first race 20. The first ribs 40 protrude integrally from the first race 20 toward one side of the second race 30, and the first ribs 40 are equally spaced along the first race and formed between the adjacent two first ribs 40 a first curved groove 22. The second ribs 50 protrude integrally from the second race 30 toward one side of the first race 20, and the second ribs 50 are equally spaced along the second race 30 and formed between the adjacent two second ribs 50 a second curved groove 32.

Figure 4:
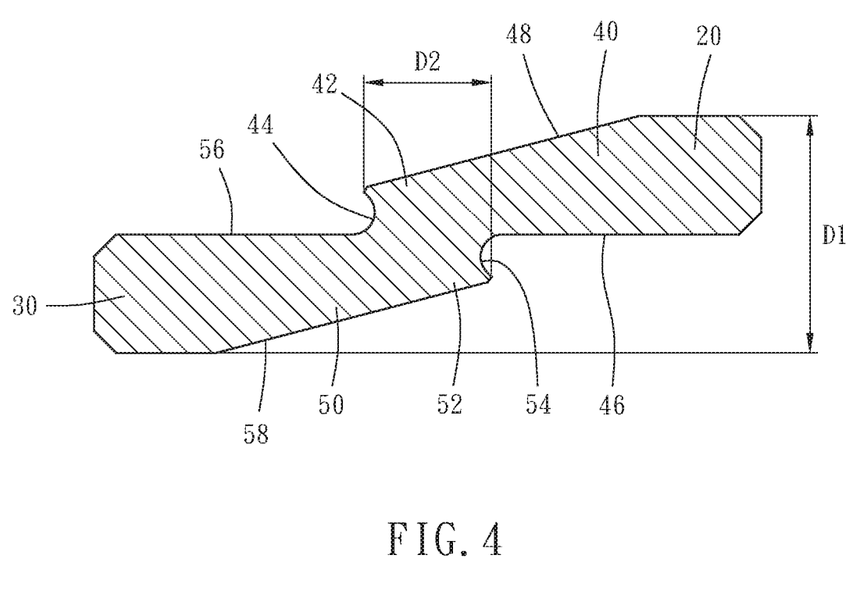
FIG. 4 is an enlarged view of a part of FIG. 3.

As illustrated in FIG. 4, each first rib 40 has a first free end 42 and a first guiding groove 44 located on an end edge of the first free end 42. The cross-sectional shape of the first guiding groove 44 is curved in this embodiment. Each second rib 50 has a second free end 52 and a second guiding groove 54 located on an end edge of the second free end 52. The cross-sectional shape of the second guiding groove 54 is curved in this embodiment. Each first rib 40 further has a first bearing plane 46 and a first guiding ramp 48 facing away from the first bearing plane 46. Each second rib 50 further has a second bearing plane 56 and a second guiding ramp 48 facing away from the second bearing plane 56. The second free ends 52 of the second ribs 50 are respectively stacked on the first free ends 42 of the first ribs 40 in a one-to-one manner so that the second bearing planes 56 of the second ribs 50 are respectively and partially abutted to the first bearing planes 46 of the first ribs 40, keeping the second guiding ramps 58 of the second ribs 50 in parallel to the first guiding ramps 48 of the respective first ribs 40. Thus, each first curved groove 22 mates with one respective second curved groove 32 to create one respective ball accommodation chamber 60 for accommodating one respective ball 16.

As can be seen from the above, when the ball cage 18 of the present invention is applied to a ball bearing that is lubricated with grease, the grease is held by the first ribs 40 and the second ribs 50 in the ball accommodation chambers 60, so that the grease can be evenly attached to the surface of the balls 16. When the ball cage 18 of the present invention is applied to a ball bearing that is lubricated with oil gas, the gas barrier problem generated during high-speed rotation is solved by the special structure in which the first free ends 42 of the first ribs 40 and the second free ends 52 of the second ribs 50 are combined, enabling the oil gas to be smoothly lubricated to the balls 16. Further, the flow of oil gas is improved through the first guiding grooves 44, the second guiding grooves 54, the first guiding ramps 48 and the second guiding ramps 58. It is worth mentioning that in order to maintain the structural strength of the ball cage 18 and to optimize the lubrication of grease or oil gas, as illustrated in FIG. 4, the shortest distance between the outer circumference of the first race 20 and the inner circumference of the second race 30 is defined as D1, the distance between the end edge of the first free end 42 of each first rib 40 and the end edge of the second free end 52 of the respective second rib 50 is defined as D2. The following relation is satisfied: 0.5D1<D2<D1. If D2 is less than 0.5D1, the connection part between the first ribs 40 and the second ribs 50 will be too small, which may cause the strength of the ball cage 18 to be insufficient. If D2 is greater than D1, the connection part between the first ribs 40 and the second ribs 50 will be too large, which may cause an air barrier so that the oil gas is blocked and cannot be lubricated to the balls. In other words, under the condition that 0.5D1<D2<D1 is satisfied, the ball cage 18 of the present invention can be commonly used for ball bearings lubricated with grease or oil gas to increase the convenience of use.

The following table shows the specifications of two ball cages using the structure of the present invention:

| | Type | |
|---|---|---|
| Parameter | Cage 1 | Cage 2 |
| BD (mm) | 8.731 | 11.906 |
| OD (mm) | 69 | 96.6 |
| id (mm) | 61 | 85 |
| D (mm) | 9.1 | 12.1 |

Figure 5:
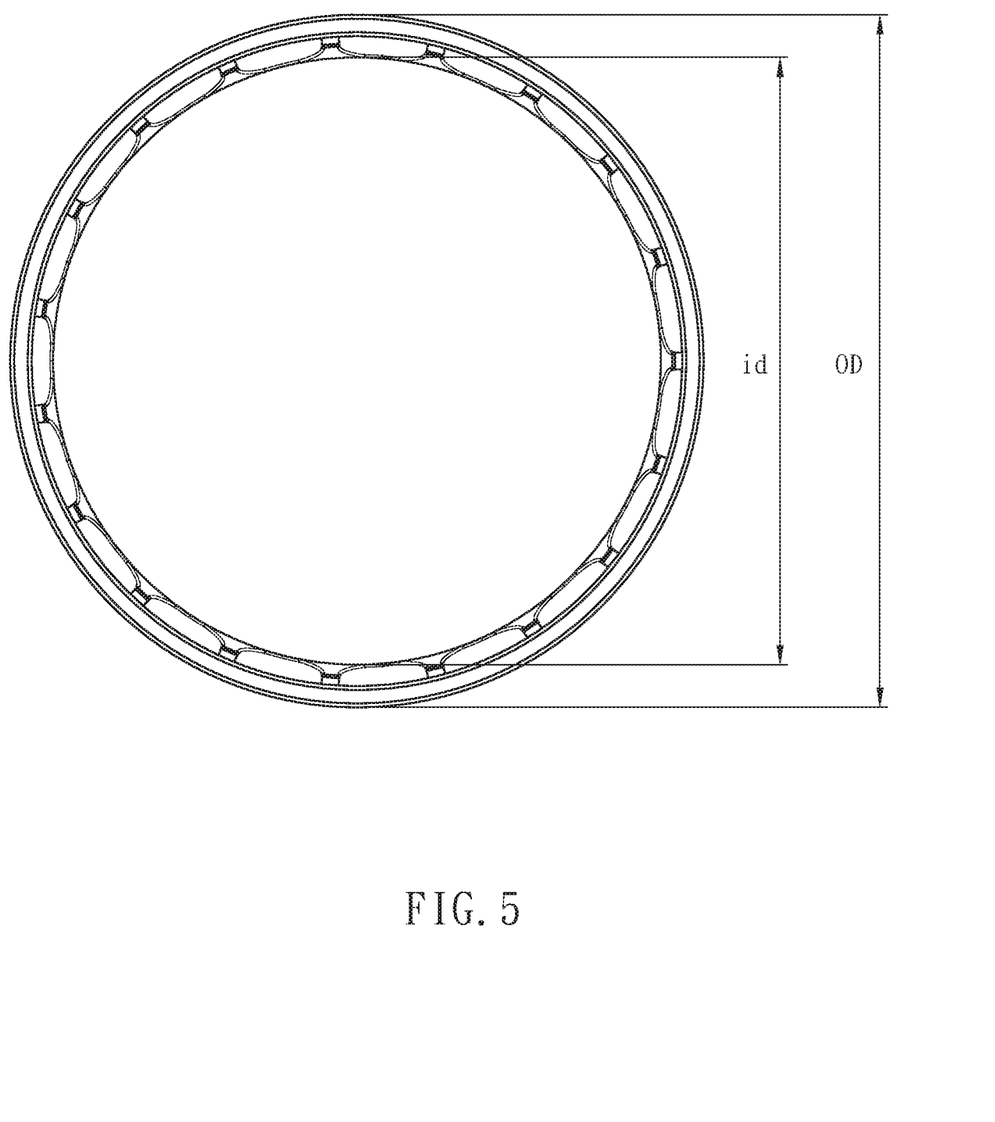
FIG. 5 is a rear side view of the ball cage in accordance with the present invention.

In the table above, BD is the diameter of the ball 16; OD is the outer diameter of the ball cage 18 (see FIG. 5); id is the inner diameter of the ball cage 18 (see FIG. 5); D is the diameter of the ball accommodation chamber 60.

The table below shows the ball's 16 contact force for the two different ball cages at the highest operating rotation speed:

| | Parameter | | | |
|---|---|---|---|---|
| Type | Rotation Speed (RPM) | Average contact force (N) | Maximum contact force (N) | Allowable force (N) |
| Cage 1 | 32,000 | 98 | 220 | 1200 |
| Cage 2 | 24,000 | 211 | 450 | 1200 |

Figure 7:
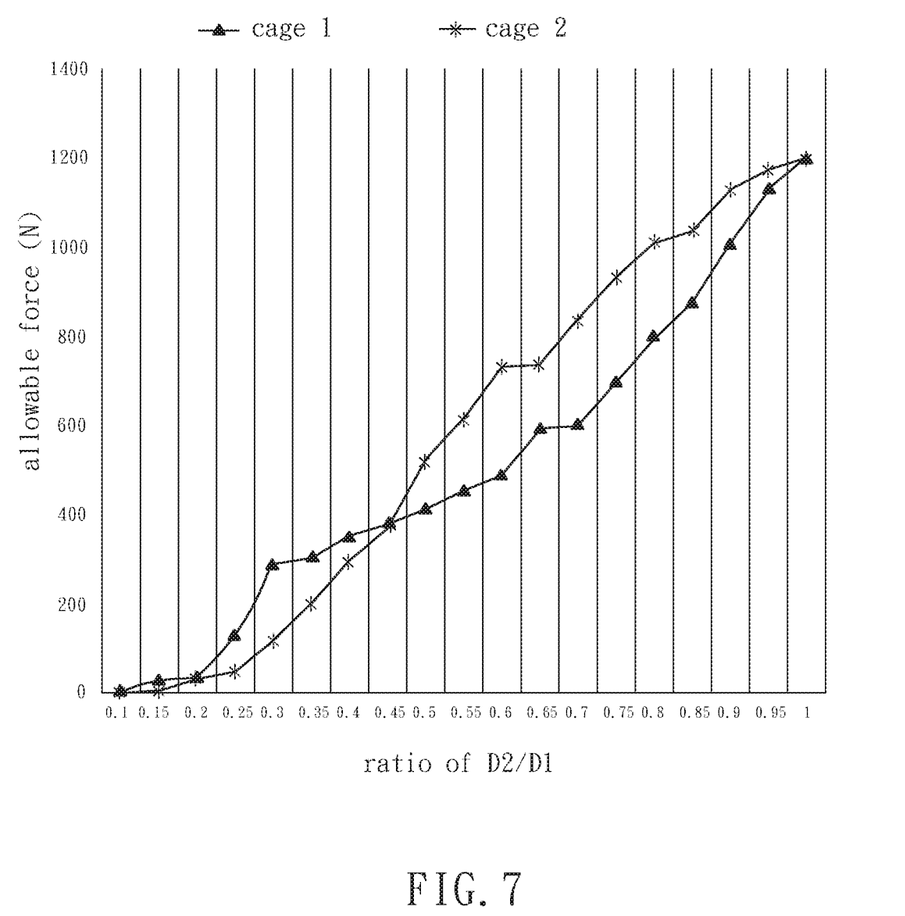
FIG. 7 is a line graph of the ball cage in accordance with the present invention.

If the ratio of D2/D1 is the horizontal axis and the allowable force of the ball cage (the maximum force that the ball cage can withstand before the damage) is the vertical axis, the chart is as shown in FIG. 7. Since the maximum contact force of the cage 1 and the cage 2 are 220N and 450N, respectively, the ratio of D2/D1 needs to be greater than 0.5 to allow the structure to have sufficient strength.

Figure 6A:
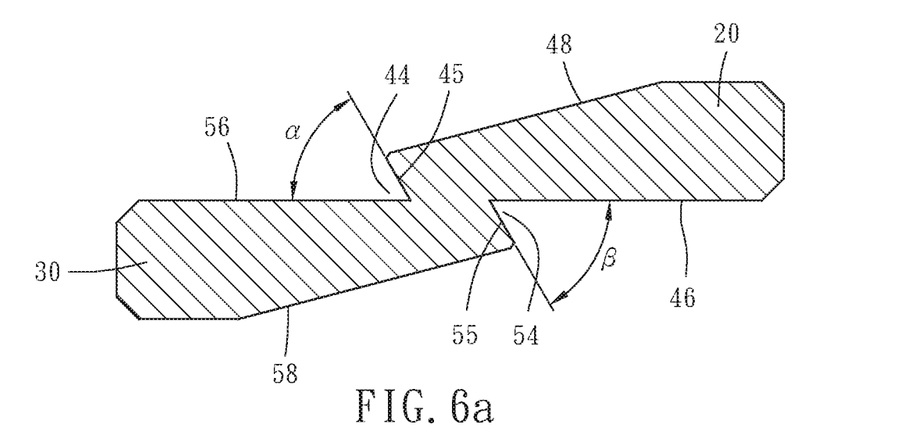
FIGS. 6a-6c are similar to FIG. 4, illustrating the non-arc configurations of the first guiding groove and the second guiding groove.
Figure 6B:
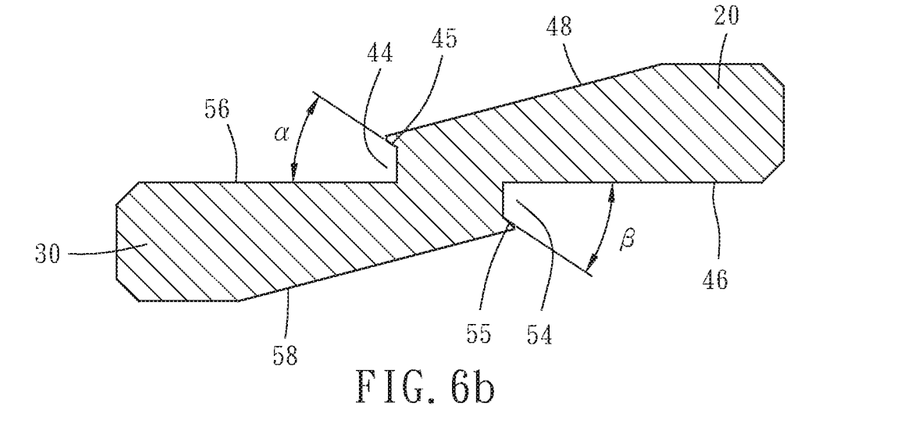
Figure 6C:
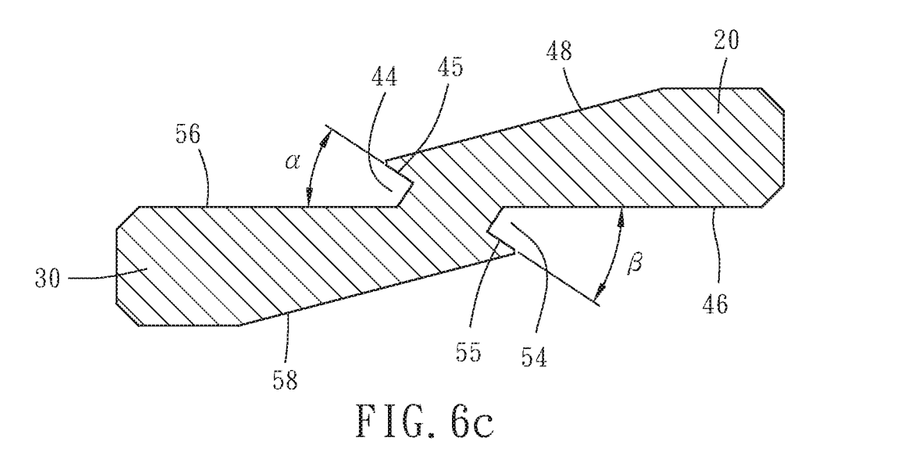

It should be additionally noted that the cross-sectional shapes of the first and second guiding groove 44 and 54 are not limited to arc shapes and may also be presented in non-arc shapes. In the case that the cross-sectional shapes of the first and second guiding groove 44 and 54 are presented in non-arc shapes, as shown in FIGS. 6a-6c, the groove wall of each of the first guiding grooves 44 has a first engaging surface 45 that engages the first guiding ramp 48. The first engaging surface 45 and the second bearing plane 56 define therebetween a first contained angle α between 30 degrees and 90 degrees. The groove wall of each of the second guiding grooves 54 has a second engaging surface 55 that engages the second guiding ramp 58. The second engaging surface 55 and the first bearing plane 46 define therebetween a second contained angle β between 30 degrees and 90 degrees (in FIGS. 6a-6c, the first contained angle α is equal to the second contained angle (3). If the first angle α and the second angle β are less than 30 degrees, the first race 20 and the second race 30 may be disconnected. If the first angle α and the second angle β are greater than 90 degrees, the first guiding groove 44 and the second guiding groove 54 may not be formed. In other words, the flow of oil gas is enhanced by the first guiding groove 44 and the second guiding groove 54 under the condition that the first angle α and the second angle are between 30 degrees and 90 degrees.

What is claimed is:

1. A ball cage for ball bearing, comprising a first race, a second race, a plurality of first ribs and a plurality of second ribs, said second race coaxially mating with said first race, an outer diameter of said second race being smaller than an outer diameter of said first race, said first ribs protruding from said first race toward said second race and equally spaced along said first race so that a first curved groove is defined between each two adjacent said first ribs, each said first rib having a first free end and a first guiding groove located on an end edge of said first free end, said seconds ribs protruding from said second race toward said first race and equally spaced along said second race so that a second curved groove is defined between each two adjacent said second ribs, each said second rib having a second free end and a second guiding groove located on an end edge of said second free end, said second free ends of said second ribs being respectively within said first free ends of said first ribs in a one-to-one manner so that each said first curved groove mates with one said second curved groove to create one respective ball accommodation chamber.

2. The ball cage for ball bearing as claimed in claim 1, wherein a shortest distance between an outer circumference of said first race and an inner circumference of said second race is defined as D1; a distance between the end edge of said first free end of each said first rib and the end edge of said second free end of the respective said second rib is defined as D2; D1 and D2 satisfy the relation of 0.5D1<D2<D1.

3. The ball cage for ball bearing as claimed in claim 1, wherein each said first rib further comprises a first bearing plane and a first guiding ramp facing away from said first bearing plane; each said second rib further comprises a second bearing plane and a second guiding ramp facing away from said second bearing plane; said first bearing plane of each said first rib is partially abutted against said second bearing plane of a respective one of said second ribs; said first guiding ramp of each said first rib is disposed in parallel to said second guiding ramp of a respective one of said second ribs.

4. The ball cage for ball bearing as claimed in claim 3, wherein a cross section of each of said first and second guiding grooves has a non-arc shape; each said first guiding groove comprises a first engaging surface located on a groove wall thereof and abutted to said first guiding ramp, said first engaging surface defining with said second bearing plane a first contained angle between 30 degrees and 90 degrees; each said second guiding groove comprises a second engaging surface located on a groove wall thereof and abutted to said second guiding ramp, said second engaging surface defining with said first bearing plate a second contained angle between 30 degrees and 90 degrees.

5. The ball cage for ball bearing as claimed in claim 1, wherein a cross section of each of said first and second guiding grooves has an arc shape.

\* \* \* \* \*